United States Patent
Levin et al.

(10) Patent No.: US 6,229,841 B1
(45) Date of Patent: May 8, 2001

(54) METHOD AND APPARATUS FOR ENERGY ESTIMATION IN A WIRELESS RECEIVER CAPABLE OF RECEIVING MULTIPLE INSTANCES OF A COMMON SIGNAL

(75) Inventors: Jeffrey A. Levin; Christopher C. Riddle; Thomas B. Sherman, all of San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/258,086

(22) Filed: Feb. 25, 1999

Related U.S. Application Data

(63) Continuation-in-part of application No. 09/209,356, filed on Dec. 11, 1998, now Pat. No. 6,130,923.

(51) Int. Cl.$^7$ .......................... H04B 1/707; H04B 7/005
(52) U.S. Cl. .................. 375/147; 375/148; 375/340; 375/349; 455/522
(58) Field of Search .................. 375/130, 144, 375/147, 148, 224, 260, 267, 340, 347, 349; 370/320, 335, 342; 455/436, 442, 522

(56) References Cited

U.S. PATENT DOCUMENTS

| | | | |
|---|---|---|---|
| 4,894,842 | 1/1990 | Broekhoven et al. | 375/1 |
| 4,901,307 | 2/1990 | Gilhousen et al. | 375/18 |
| 5,056,109 | 10/1991 | Gilhousen et al. | 375/1 |
| 5,101,501 | 3/1992 | Gilhousen et al. | 455/33 |
| 5,103,459 | 4/1992 | Gilhousen et al. | 375/1 |
| 5,109,390 | 4/1992 | Gilhousen et al. | 375/1 |
| 5,150,384 * | 9/1992 | Cahill | 375/375 |
| 5,361,276 | 11/1994 | Subramanian | 375/1 |
| 5,442,627 | 8/1995 | Viterbi et al. | 370/22 |
| 5,490,165 | 2/1996 | Blakeney, II et al. | 375/205 |
| 5,561,618 | 10/1996 | Dehesh | 364/725 |
| 5,629,934 * | 5/1997 | Ghosh et al. | 370/335 |
| 5,644,591 | 7/1997 | Sutton | 375/200 |
| 5,654,979 | 8/1997 | Levin et al. | 375/206 |
| 5,703,902 | 12/1997 | Ziv et al. | 375/200 |
| 5,761,204 | 6/1998 | Grob et al. | 370/467 |
| 5,764,687 | 6/1998 | Easton | 375/206 |
| 5,805,648 | 9/1998 | Sutton | 375/367 |
| 6,067,315 * | 5/2000 | Sandin | 375/140 |
| 6,070,086 * | 5/2000 | Dobrica | 455/522 |
| 6,097,336 * | 8/2000 | Stilp | 342/357.02 |
| 6,097,972 * | 9/2000 | Saints et al. | 455/522 |

FOREIGN PATENT DOCUMENTS

| | | | |
|---|---|---|---|
| 9413066 | 6/1994 | (WO) | H04B/1/66 |
| 9512262 | 5/1995 | (WO) | H04J/13/00 |

* cited by examiner

Primary Examiner—Young T. Tse
(74) Attorney, Agent, or Firm—Philips Wadsworth; Charles Brown; Bruce Greenhaus

(57) ABSTRACT

In a remote unit receiver capable of demodulating a plurality of signal instances corresponding to a singe remote unit transmitted signal, a first instance of a signal is demodulated to produce a first set of energy values corresponding to a set of possible data values of the signal. A second instance of the signal is demodulated to produce a second set of energy values corresponding to the set of possible data values. The first and the second sets of energy values are then combined to determine a combined set of energy values. A first estimate of a most likely transmitted data value is determined based upon the combined set of energy values An energy level of the first instance is determined based upon the energy value within the first set of energy values corresponding to the first estimate of the most likely transmitted data value.

20 Claims, 7 Drawing Sheets

METHOD AND APPARATUS FOR ENERGY ESTIMATION IN A WIRELESS RECEIVER CAPABLE OF RECEIVING MULTIPLE INSTANCES OF A COMMON SIGNAL

CROSS-REFERENCE TO RELATED APPLICATIONS

This patent application is a CIP of Ser. No. 09/209,356, which was filed on Dec. 11, 1998, now U.S. Pat. No. 6,130,923.

BACKGROUND OF THE INVENTION

I. Field of the Invention

The invention relates to communication systems. More particularly, the invention relates to energy estimation in a wireless receiver.

II. Description of the Related Art

FIG. 1 is an exemplifying embodiment of a terrestrial wireless communication system 10 and such a system can be generally discussed with reference thereto. FIG. 1 shows three remote units 12A, 12B and 12C and two base stations 14. In reality, typical wireless communication systems may have many more remote units and base stations. In FIG. 1, the remote unit 12A is shown as a mobile telephone unit installed in a car. FIG. 1 also shows a portable computer remote unit 12B and the fixed location remote unit 12C such as might be found in a wireless local loop or meter reading system. In the most general embodiment, remote units may be any type of communication unit. For example, the remote units can be hand-held personal communication system units, portable data units such as a personal data assistant, or fixed location data units such as meter reading equipment. FIG. 1 shows a forward link signal 18 from the base stations 14 to the remote units 12 and a reverse link signal 20 from the remote units 12 to the base stations 14.

In a typical wireless communication system, such as that illustrated in FIG. 1, some base stations have multiple sectors. A multi-sectored base station comprises multiple independent transmit and receive antennas as well as independent processing circuitry. The principles discussed herein apply equally to each sector of a multi-sectored base station and to a single-sectored independent base station. For the remainder of this description, therefore, the term "base station" can be assumed to refer to either a sector of a multi-sectored base station, a single-sectored base station or a multi-sectored base station.

In a code division multiple access (CDMA) system, remote units use a common frequency band for communication with all base stations in the system. Use of a common frequency band adds flexibility and provides many advantages to the system. For example, the use of a common frequency band enables a remote unit to simultaneously receive communications from more than one base station as well as transmit a signal for reception by more than one base station. The remote unit can discriminate and separately receive the simultaneously received signals from the various base stations through the use of the spread spectrum CDMA waveform properties. Likewise, the base station can discriminate and separately receive signals from a plurality of remote units. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", assigned to the assignee of the present invention and incorporated by reference herein. The use of CDMA techniques in a multiple access communication system is further disclosed in U.S. Pat. No. 5,103,459, entitled "SYSTEM AND METHOD FOR GENERATING SIGNAL WAVEFORMS IN A CDMA CELLULAR TELEPHONE SYSTEM", assigned to the assignee of the present invention and incorporated by reference herein.

CDMA communication techniques offer many advantages over narrow band modulation techniques. In particular, the terrestrial channel poses special problems by the generation of multipath signals which can be overcome through the use of CDMA techniques. For example, at the base station receiver, separate multipath instances from a common remote unit signal can be discriminated and separately received using similar CDMA techniques as those used to discriminate between signals from the various remote units.

In the terrestrial channel, multipath is created by reflection of signals from obstacles in the environment, such as trees, buildings, cars and people. In general, the terrestrial channel is a time varying multipath channel due to the relative motion of the structures that create the multipath. For example, if an ideal impulse is transmitted over a multipath channel, a stream of pulses is received. In a time varying multipath channel, the received stream of pulses changes in time location, amplitude and phase as a function of the time at which the ideal impulse is transmitted.

FIG. 2 shows an exemplifying set of signal instances from a single remote unit as they appear upon arrival at the base station. The vertical axis represents the power received on a dB scale. The horizontal axis represents the delay in arrival of the instances at the base station due to transmission path delays. An axis (not shown) going into the page represents a segment of time. Each signal instance in the common plane of the page has arrived at a common time but was transmitted by the remote unit at a different time. In a common plane, peaks to the right represent signal instances which were transmitted at an earlier time by the remote unit than peaks to the left. For example, the left-most peak 20 corresponds to the most recently transmitted signal instance. Each signal peak 20–30 corresponds to a signal which has traveled a different path and, therefore, exhibits a different time delay and a different phase and amplitude response.

The six different signal spikes represented by peaks 20–30 are representative of a severe multipath environment. Typical urban environments produce fewer usable instances. The noise floor of the system is represented by those peaks and dips having lower energy levels.

Note that each of the multipath peaks varies in amplitude as a function of time as shown by the uneven ridge of each multipath peak 20–30. In the limited time shown, there are no major changes in the amplitude of the multipath peaks 20–30. However, over a more extended time range, multipath peaks diminish in amplitude and new paths are created as time progresses. The peaks can also slide to earlier or later time offsets as path distances change due to movement of objects in the coverage area of the base station.

In addition to the terrestrial environment, multiple signal instances can also result from the use of satellite systems. For example, in a GlobalStar system, remote units communicate through a series of satellites rather than terrestrial base stations. The satellites each orbit the earth in approximately 2 hours. The movement of the satellite through its orbit causes the path distance between the remote unit and the satellite to change over time. In addition, as a satellite moves out of range of the remote unit, a soft hand-off from one satellite to another satellite is performed. During the soft hand-off, the remote unit demodulates signals from more than one satellite. These multiple signal instances can be combined in the same manner as the multipath signal instances in a terrestrial system. One difference, however, is that the signal instances tend to be offset from one another by approximately 1–50 milliseconds in the terrestrial environment while the signal instances received through two satellites tend to be offset from one another the order of 0–20 milliseconds.

FIG. 3 is a block diagram of a prior art receiver which can be used in a terrestrial multipath environment or a satellite environment which incorporates soft hand-off capability. The diversity receiver shown in FIG. 3 is often called a "rake" receiver. Typically, a rake receiver comprises a demodulator which in turn comprises a series of demodulation elements, each one of which represents one finger in the rake receiver. Each demodulation element can be assigned to demodulate a unique signal instance.

Typically, in a rake receiver, the demodulation elements are assigned to signal instances which have been detected by a searcher element. The searcher element continues to search for newly developing signal instances by continually correlating the incoming signal samples at a variety of time offsets. The output of the searcher element is provided to a system controller. Based upon the output of the searcher element, the system controller assigns the demodulation elements to the most advantageous signal instances. Once assigned to a particular signal instance, the demodulation element tracks changes in the arrival time of the signal.

The receiver in FIG. 3 comprises N demodulation elements 98A–98N, each of which has a similar structure. In FIG. 3, elements 100A–108A represent the relevant portions of the demodulation element 98A. A despreader 100A correlates the incoming signal samples with the spreading code used to spread the signal at the corresponding remote unit. The samples output by the despreader 100A are input into a Fast Hadamard Transformer (FHT) 102A. The FHT correlates the data produced by the despreader 100A with a set of possible symbol values. For example, in one embodiment, the system operates in accordance with the Telephone Industry Association, Electronic Industry Association (TIA/EIA) interim standard entitled "Mobile Station - Base Station Capability Standard for Dual-Mode Wideband Spread Spectrum Cellular System," TIA/EIA/IS-95 (referred to as IS-95), the contents of which are incorporated herein by reference. In such a system, groups of six data bits are mapped into 1 of 64 orthogonal Walsh symbols. The FHT 102A produces 64 different voltage levels corresponding to the 64 different possible symbol values. The results are coupled to an energy determination block 104A which determines a corresponding energy value for each of the 64 possible symbol values. A maximum detector 106A chooses the most likely transmitted data value based upon the 64 energy values.

In order to determine whether the demodulation element 98A is assigned to a viable signal instance, the demodulation element 98A comprises a lock detector 108A. The lock detector 108A monitors the average energy detected by the demodulation element 98. So long as the average energy detected by the demodulation element 98 remains above an acceptable threshold, the demodulation element 98 is assumed to be demodulating a valid signal instance. If the average energy detected by the lock detector 108A falls below a predetermined value, the demodulation element 98 discontinues demodulation of the signal instance and may be reassigned to another signal instance. In this way, the system is able to detect the diminishing amplitude of a signal instance so that system resources are not unnecessarily expended on the demodulation of an invalid signal and so that the high error rate associated with demodulation of extremely small signals is avoided.

The output of the lock detector 108A is typically a 1 bit binary value indicating either a state of lock or unlock. Typically, the lock detector 108A is coupled to a system controller 114 which governs the assignment of demodulation element resources to the available signals instances.

The demodulation elements 98B–98N comprise similar blocks which execute similar functions as those just described. As noted above, in a rake receiver, the energy detected by the demodulation elements 98A–98N can be combined. Thus, the output of the energy detection blocks 104A–104N are coupled to a multipath combiner 110. The multipath combiner 110 combines the energy produced by each demodulation element 98A–98N which is currently in a state of lock and produces a set of 64 combined energy levels. The output of the multipath combiner 110 is coupled to a maximum detector block 112 which determines the most like data transmitted based upon the combined data. For example, in one embodiment, the maximum detector 112 operates in accordance with U.S. Pat. No. 5,442,627 entitled "Noncoherent Receiver Employing a Dual-Maxima Metric Generation Process" assigned to the assignee hereof and incorporated herein in its entirety by reference.

Additional information concerning rake receivers, demodulators and time tracking can be found in U.S. Pat. No. 5,654,979 entitled "Cell Site Demodulation Architecture for a Spread Spectrum Multiple Access Communication", U.S. Pat. No. 5,644,591 "Method and Apparatus for Performing Search Acquisition in a CDMA Communications System", U.S. Pat. No. 5,561,618 entitled "Method and Apparatus for Performing a Fast Hadamard Transform", U.S. Pat. No. 5,490.165 entitled "Demodulation Element Assignment in a System Capable of Receiving Multiple Signals", and U.S. Pat. No. 5,805,648 entitled "Method and Apparatus for Performing Search Acquisition in a CDMA Communication System", each of which is assigned to the assignee hereof and incorporated in its entirety herein by this reference.

Although the combined error rate of the output of the maximum detector 112 is typically less than ten percent, the error rates of the individual demodulation elements 98A–98N before combining are typically significantly higher. For example, during a fade, the output of the maximum detector block 106A may be as high as 80%, meaning that 4 out of 5 decisions made by the maximum detector 106A are wrong, and, hence, 4 out of 5 energy values input into the lock detector 108A are noise values rather than signal values. Obviously, in such a case, the output of the lock detector 108A does not reflect the actual energy being detected by the demodulation element 98A. Because of the way in which the maximum detector 106A operates, when an error occurs, the energy level output by the maximum detector 106A is always larger than the actual energy detected in the signal. Thus, as these noise levels are averaged with the signal energy levels, the average energy level detected by the lock detector 108A is higher than the actual signal level. The energy level threshold used to determine lock detection should be high enough to avoid false indications of lock detection based upon the detection of noise. A threshold energy level which is high enough to avoid false detection higher than the energy level which is present when the demodulation element 98A is demodulating a viable, low energy signal. Thus, the prior art system shown in FIG. 3 can not accurately distinguish between a valid but low power signal instance and arbitrary noise.

In the ideal case, the lock detector 108A is perfectly correlated with the performance of the demodulation element 98A. In this way, when the demodulation element 98A is demodulating a valid signal instance, the lock detector 108A generates an indication of a locked state. When the demodulation element is no longer producing valid energy levels, the lock detector 108A indicates a state of unlock. However, for the reasons noted above, the receiver in FIG. 3 does not facilitate a precise correlation between the output of the lock detector 108A an the actual performance of the demodulation element 98A. If the lock detector indicates a state of lock when the demodulation element 98A is not producing valid energy levels, the combined result of the rake receiver is degraded by the addition of the energy values from this demodulation element 98A, thus reducing the performance of the rake receiver. If the demodulation element 98A indicates a state of unlock when the demodulation element 98A is actually producing valid energy levels, the rake receiver does not combine the energy levels produced by the demodulation element 98A with the other energy values. In this way, the performance of the rake receiver is also decreased because of the omission of the valid energy levels.

Therefore, there has been a long felt need in the art for a lock detection mechanism which provides a more accurate determination of the energy in a signal instance.

SUMMARY OF THE INVENTION

In a remote unit receiver capable of demodulating a plurality of signal instances corresponding to a single remote unit transmitted signal, a first instance of a signal is demodulated to produce a first set of energy values corresponding to a set of possible data values of the signal. A second instance of the signal is demodulated to produce a second set of energy values corresponding to the set of possible data values. The first and the second sets of energy values are then combined to determine a combined set of energy values. A first estimate of a most likely transmitted data value is determined based upon the combined set of energy values An energy level of the first instance is determined based upon the energy value within the first set of energy values corresponding to the first estimate of the most likely transmitted data value. Because the first estimate of the most likely transmitted data value is a more accurate estimate than could be determined based upon one signal instance alone, the resulting energy level is also more accurate. The energy level can be used to determine a state of lock of the demodulation process or it can be used to assign demodulation resources

BRIEF DESCRIPTION OF THE DRAWINGS

The features, objectives, and advantages of the invention will become more apparent from the detailed description set forth below when taken in conjunction with the drawings.

DETAILED DESCRIPTION OF THE PREFERRED EMBODIMENT

The invention improves the ability of a receiver to estimate the energy level of a signal instance. In turn, a more accurate lock determination of a lock state of a corresponding demodulation process can be determined based upon the more accurate energy level estimation. According to the invention, energy values from more than one demodulation element are combined together to determine an estimate of the most likely transmitted data value. In turn, the energy value output by individual demodulation processes corresponding to the estimate of the most likely transmitted data value is used to determine the energy level of the corresponding signal instance—whether or not the energy value is the largest one output by the demodulation process. In this way, the energy value input into the energy determination process is less likely to be an extraneous noise level and more likely to be a valid signal energy value. The resulting energy estimation based upon these more accurate energy values is also more accurate.

Figure 1:
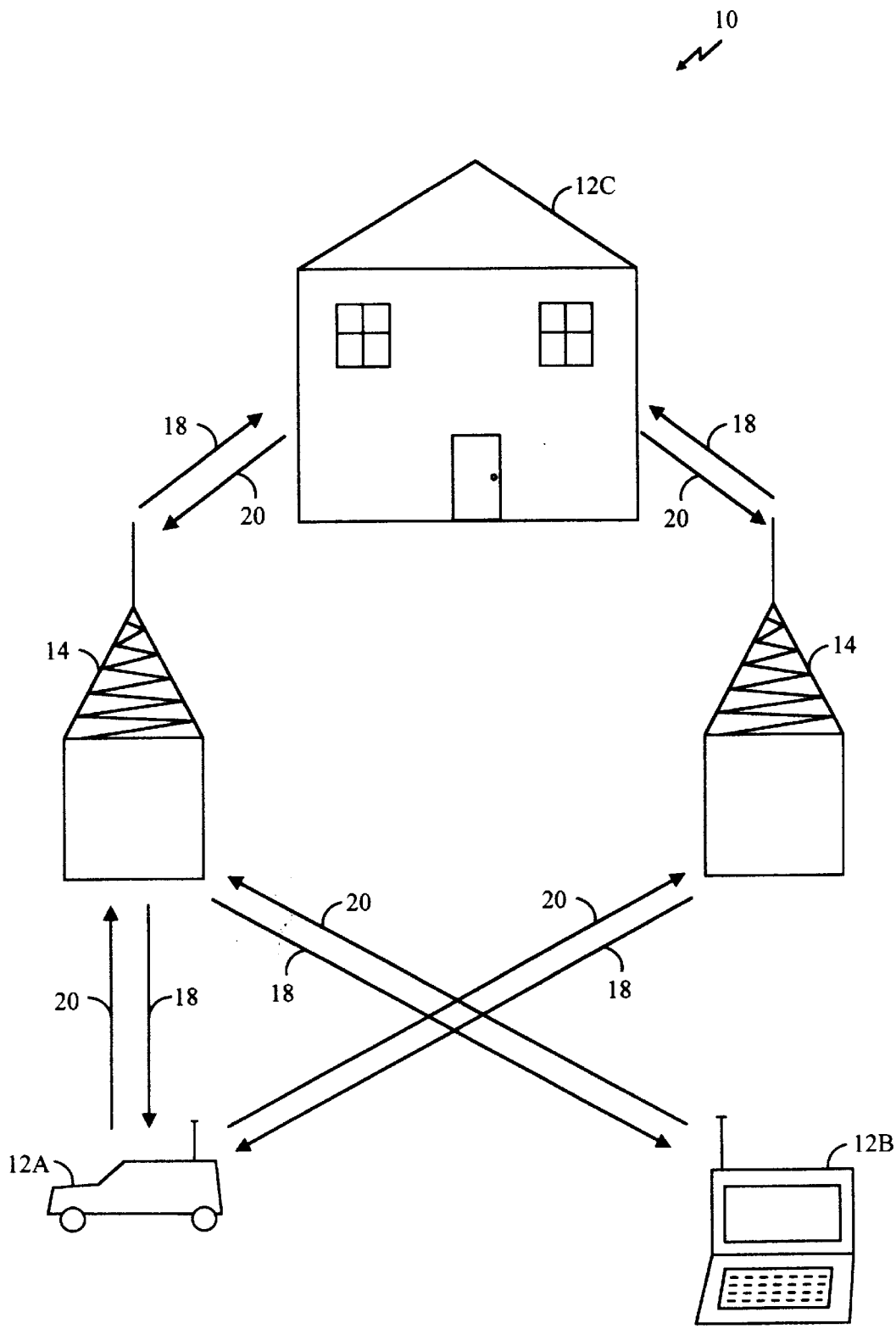
FIG. 1 is an exemplifying block diagram of a terrestrial wireless communication system.
Figure 2:
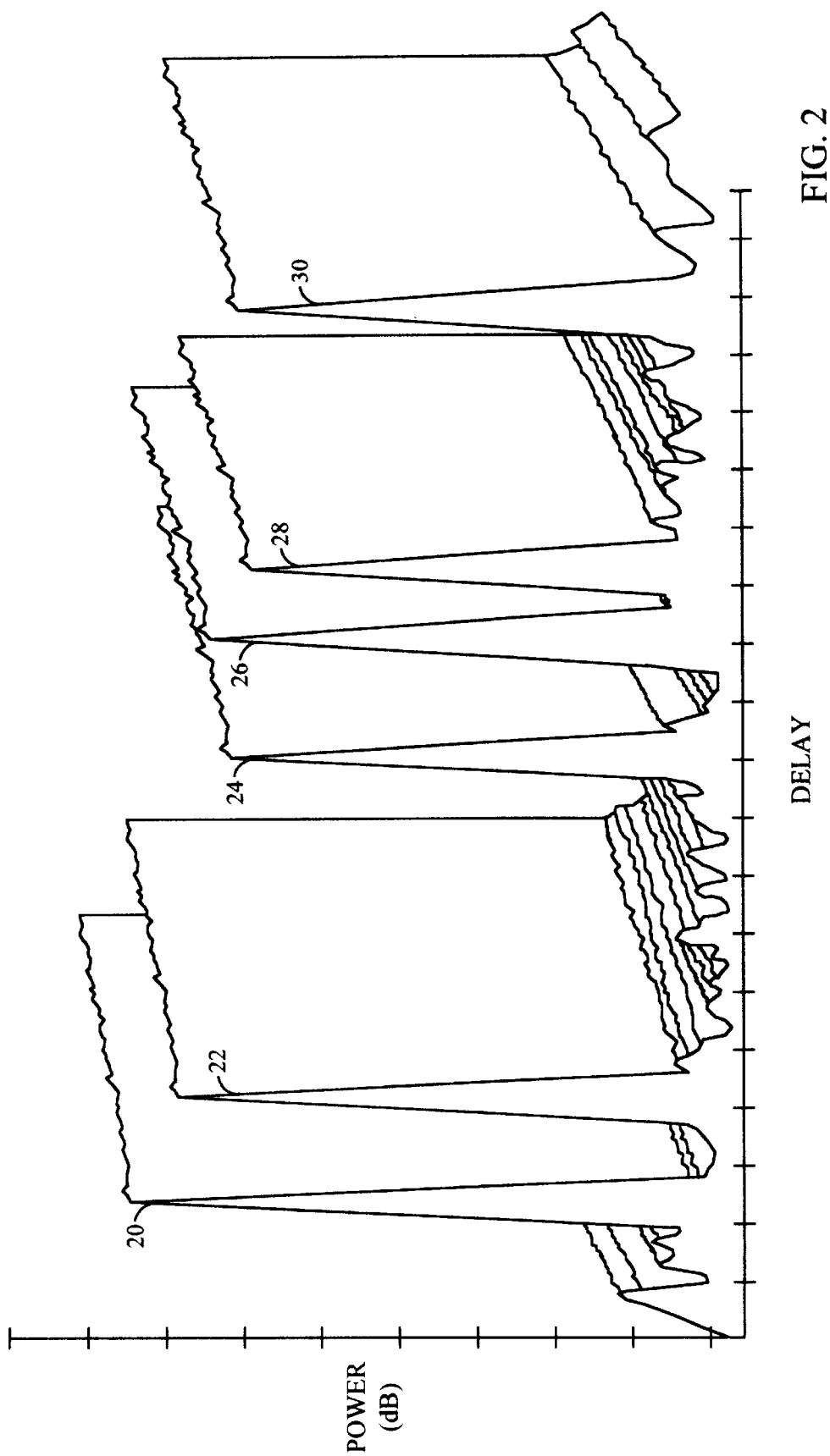
FIG. 2 is a graph showing an exemplifying set of signals from a single remote unit arriving at a base station.
Figure 3:
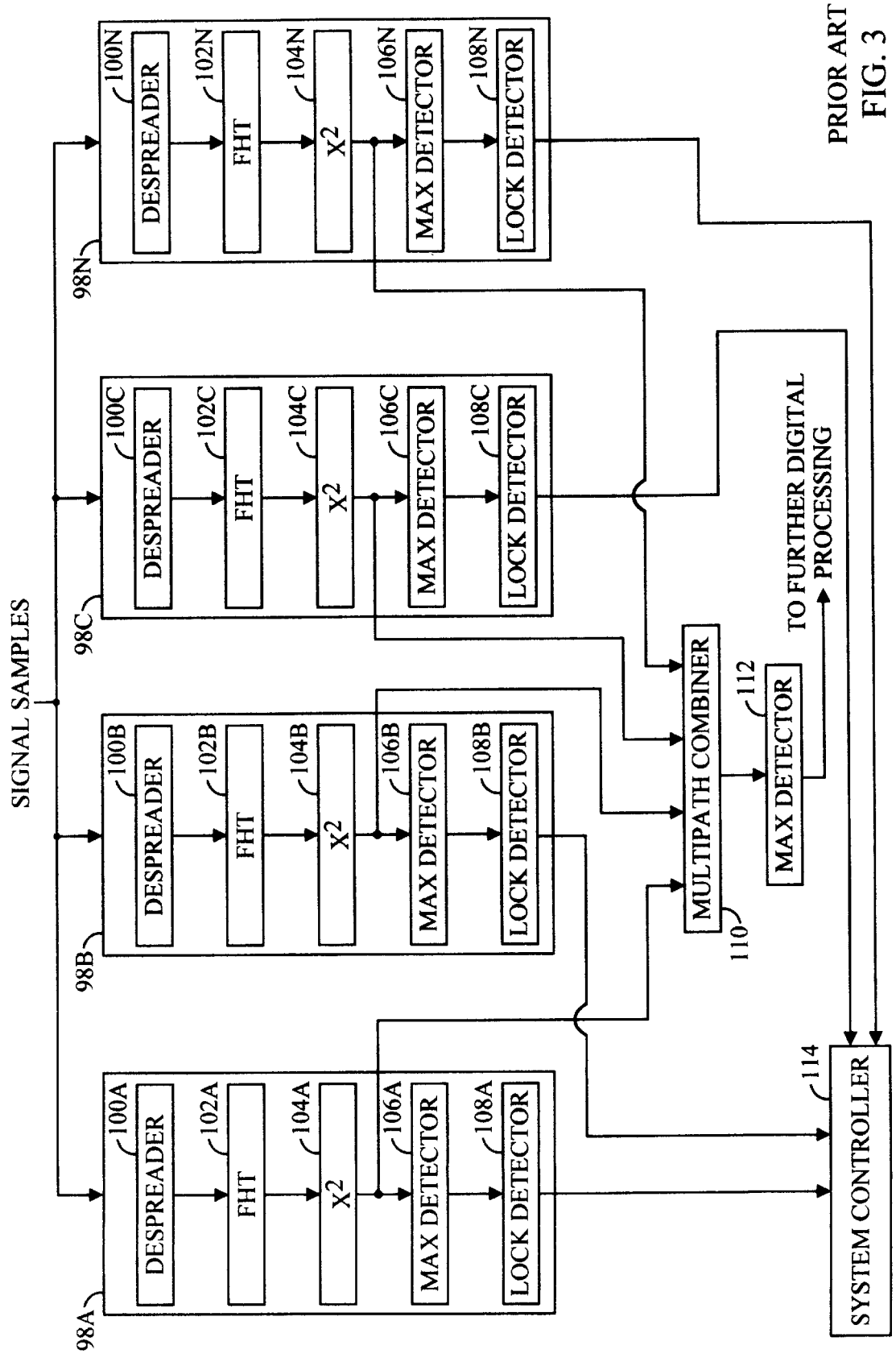
FIG. 3 is a block diagram of a prior art rake receiver.
Figure 4:
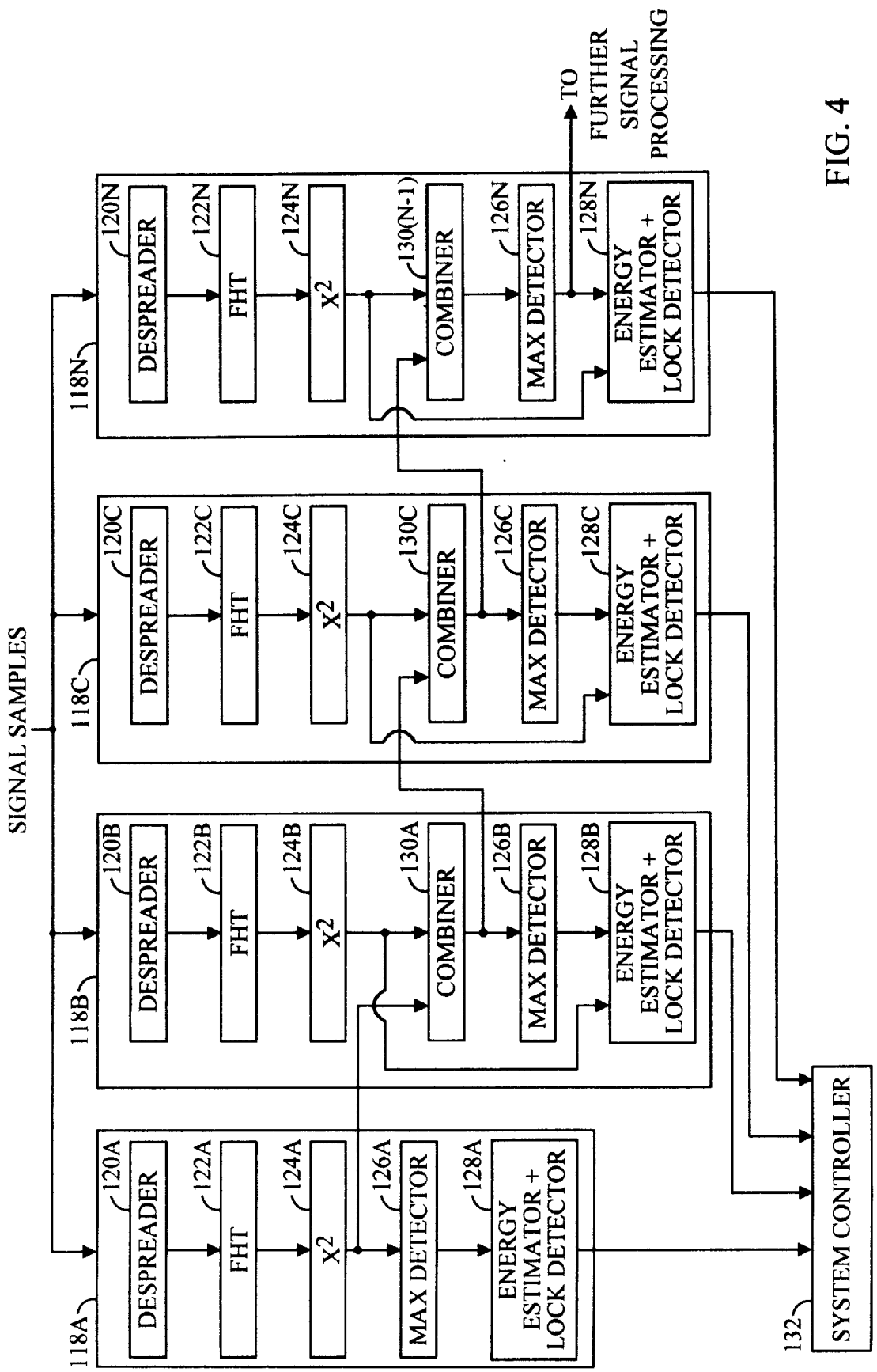
FIG. 4 is a block diagram showing an embodiment of the invention configured for use in a system in which the signal instances are received significantly offset in time from one another.

FIG. 4 is a block diagram showing an embodiment of the invention especially configured for use in a system in which the multiple instances of the signal are received significantly offset in time from one another although it can be used in other types of systems as well. For example, the receiver shown in FIG. 4 can be used in a satellite communication system in which the remote unit is capable of receiving signals from two or more satellites simultaneously. In FIG. 4, the receiver includes at least four demodulation elements 118A–118N. However, the general principles illustrated by FIG. 4 can be applied to receivers which provide for demodulation of two or more signal instances.

Signal samples from the wireless link are input in the demodulation elements 118A–118N. For purposes of discussion, in the configuration shown, the demodulation element 118A is assumed to be assigned to the earliest arriving signal instance. A despreader 120A within the demodulation element 118A is synchronized with the time offset of the assigned signal instance. The despreader 120A despreads the signal samples using the same spreading code that was used to create the signal instance. The output of the despreader 120A is coupled to a Fast Hadamard Transformer (FHT) 122A. The FHT 122A correlates the despread samples with each one of a set of possible symbols values. For example, in one embodiment, the output of the FHT 122A is 64 voltage levels, one corresponding to each of 64 possible Walsh symbols. The output of the FHT 122A is coupled to an energy determination block 124A which determines the corresponding energy level for each voltage level produced by the FHT 122A. The output of the energy determination block 124A is coupled to a maximum detector block 126A which determines a first estimate of the most likely transmitted data value. For example, the maximum detector can operate in accordance with the above-mentioned U.S. Pat. No. 5,442,627. The output of the maximum detector 126A is input into an energy estimator and lock detector 128A which operates to determine the average energy in the signal instance and whether the demodulation element 118A is demodulating a valid signal instance in a similar manner as described in the above referenced U.S. Patents. In one embodiment, the output of the lock detector 128A is coupled to a system controller 132 which executes a demodulation element assignment algorithm. In one embodiment, the system controller 132 is a general purpose microprocessor. In order to unclutter the figure, some of the connections between the demodulation elements 118A–118N and the system controller 132 are not shown.

The demodulation element 118B is configured to be assigned to the second earliest arriving signal instance. A despreader 120B is synchronized to the time offset corresponding to the second earliest arriving signal instance. The despreader 120B, a FHT 122B and an energy determination block 124B perform similar functions as the corresponding elements in the demodulation element 118A. However, the output of the energy determination block 124B is coupled to a combiner 130A. In addition, the output of the energy determination block 124A is also coupled to the input of the combiner 130A. The combiner 130A combines the signal energies output by the energy determination blocks 124A and 124B. The combiner 130A produces a set of combined energy levels, each energy level corresponding to one of the possible symbol values. The combiner 130A time aligns the output of the energy determination block 124A to the output of the energy determination block 124B and, thus, can comprise memory for storing the energy values output by the energy determination block 124A until the corresponding data is output by the energy determination block 124B. After the stored data has been combined with energy values from the energy determination block 124B, the stored data received from the energy determination block 124A can be erased, overwritten or otherwise corrupted.

According to well-known principles of communication, the output of the combiner 130A more accurately reflects the actual data transmitted then either the output of the energy determination block 124A or the output of the energy determination block 124B individually. The output of the combiner 130A is coupled to a maximum detector 126B. The maximum detector 126B determines the most likely transmitted data value based upon the output of combiner 130A and produces a corresponding indication.

The output of the maximum detector 126B is coupled to an energy estimator and lock detector 128B. In addition, the output of the energy determination block 124B is also coupled to the input of the energy estimator and lock detector 128B. The energy estimator and lock detector 128B selects the energy value corresponding to the estimate of the most likely transmitted data value as determined by the maximum detector 126B—whether or not the energy value is the largest one output by the energy determination block 124B. The energy estimator and lock detector 128B uses the selected value to determine an estimate of the energy within the second instance of the signal. For example, the energy estimator and lock detector 128B can average a series of the energy values over time. In addition, the energy estimator and lock detector 128B determines a state of lock of the demodulation element 118B based upon the estimated energy. For example, in one embodiment, the energy estimator and lock detector 128B outputs a one bit indication of an inlock state when the energy estimate exceeds a predetermined threshold and outputs a one bit indication of an out-of-lock state when the energy estimate falls below another predetermined threshold. The output of the lock detector 128B is coupled to the system controller 132.

By using the combined energy levels to select the most likely transmitted data value, the likelihood that the energy value selected for use in the energy estimation and lock detection process reflects the actual signal energy being demodulated by the demodulation element 118B increases, thus, producing a more accurate indication of the lock status of the demodulation element 118B.

Continuing in a like manner, the demodulation element 118C receives the signal samples. The despreader 120C, the FHT 122C and the energy determination block 124C each operate in a similar manner as the corresponding elements in the demodulation element 118A. It can be assumed that the demodulation element 118C is assigned to a later arriving instance of the signal than either the demodulation element 118A or the demodulation element 118B. The output of the energy determination block 124C is input into a combiner 130B. In addition, the output of the combiner 130A is input into the combiner 130B. The combiner 138B aligns in time the output of the combiner 138A with the output of the energy determination block 124C. This function may be accomplished by memory storage within the combiner 130B. After the stored values are combined with the energy values produced by the energy determination block 124C, the corresponding memory can be erased, overwritten or otherwise corrupted.

The output of the combiner 130B is input into a maximum detector block 126C. Based upon the combined energy levels produced by the combiner 130B, the maximum detector 126C determines the most likely transmitted data value. The output of the maximum detector block 126C is coupled to an energy estimator and lock detector 128C which operates in a similar manner to the energy estimator and lock detector 128B. The output of the lock detector 128C is coupled to the system controller 132.

In a similar manner, additional demodulation elements can be included in the receiver as shown by the demodulation element 118N. In each successive demodulation element, the combiner is daisy-chained with the others such that the input to the maximum detector 126N is coupled to the final combined energy values and produces the estimate used for further digital processing when all of the available demodulation element are assigned to signal instances. In this way, the accuracy of the lock detector indication for the successive demodulation elements is increased based upon the more accurate estimation of the most likely transmitted data value determined by the combined energy levels. In such a system, not all of the demodulation elements are assigned to a signal instances at all times. For example, if only two signal instances are currently available, only two signal energies are combined and the output of the first combiner is used for further processing. The output of the maximum detector corresponding to the demodulation element assigned to the latest arriving instance of the signal generates the most accurate estimate of the most likely transmitted data value. It is this value which is used in further signal processing within the receiver.

Figure 5:
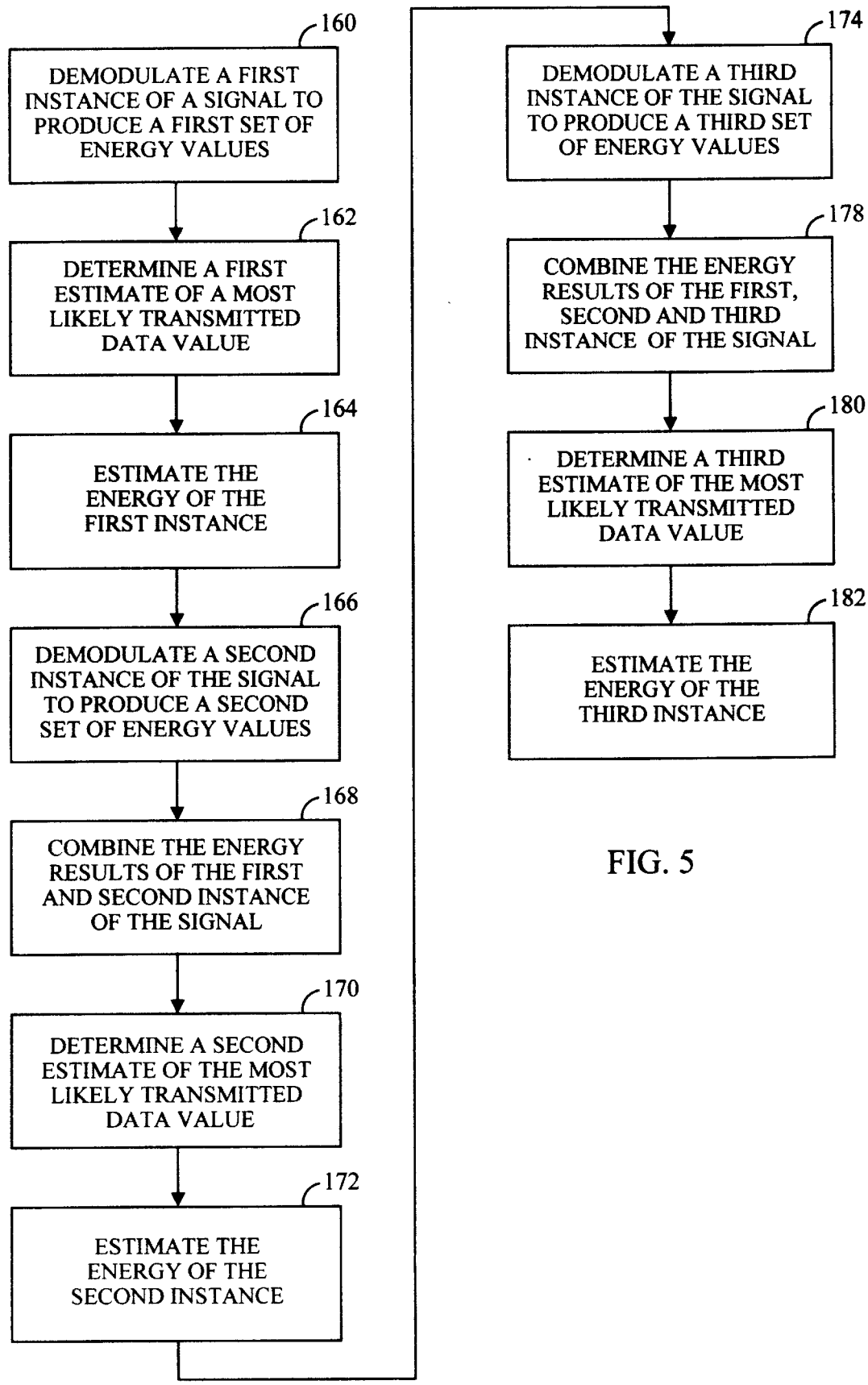
FIG. 5 is a flow chart showing operation of the invention in accordance with the embodiment of FIG. 4.

The operation of the receiver shown in FIG. 4 may be more clearly understood by reference to the flow steps shown in FIG. 5. In block 160, a first instance of the signal is demodulated to produce a first set of energy values. In block 162, a first estimate of the most likely transmitted data value is determined. In block 164, an estimate of the energy in the first instance is determined based upon the first estimate of the most likely transmitted data value.

In block 166, a second instance of the signal is demodulated to produce a second set of energy values. In block 168, the energy values produced by the demodulation of the first and second instances of the signal are combined. In block 170, a second estimate of the most likely transmitted data value is determined. In block 172, an estimate of the energy in the second instance of the signal is determined based upon the second estimate of the most likely transmitted data value. According to well-known principles of communication theory, the second estimate of the most likely transmitted data value is on average more accurate than the first estimate due to the additional information about the signal gained through the second set of energy values and the second estimate of the most likely transmitted data value is a better estimate than could be obtained by simple reliance on the second set of energy values. Therefore, the energy level corresponding to the second estimate of the most likely transmitted data value is a more accurate reflection of the energy received at the base station in the second instance of the signal, thus, increasing the accuracy of the energy estimation determination.

As noted above, and as shown in FIG. 4, this process may be continued for other instances of the signal. For example, in block 174, a third instance of the signal is demodulated to produce a third set of energy values. The energy values are combined with the first and second sets of energy values in block 178. In block 180, a third estimate of the most likely transmitted data value is determined based upon the combined energies. The third estimate is more accurate than either the second or the first estimate on average due to the additional information gained by combination of the third set of energy values. In block 182, an estimate of the energy of the third instance of the signal is determined based upon the energy value within the third set of energy values corresponding to the third estimate of the most likely transmitted data value.

Figure 6:
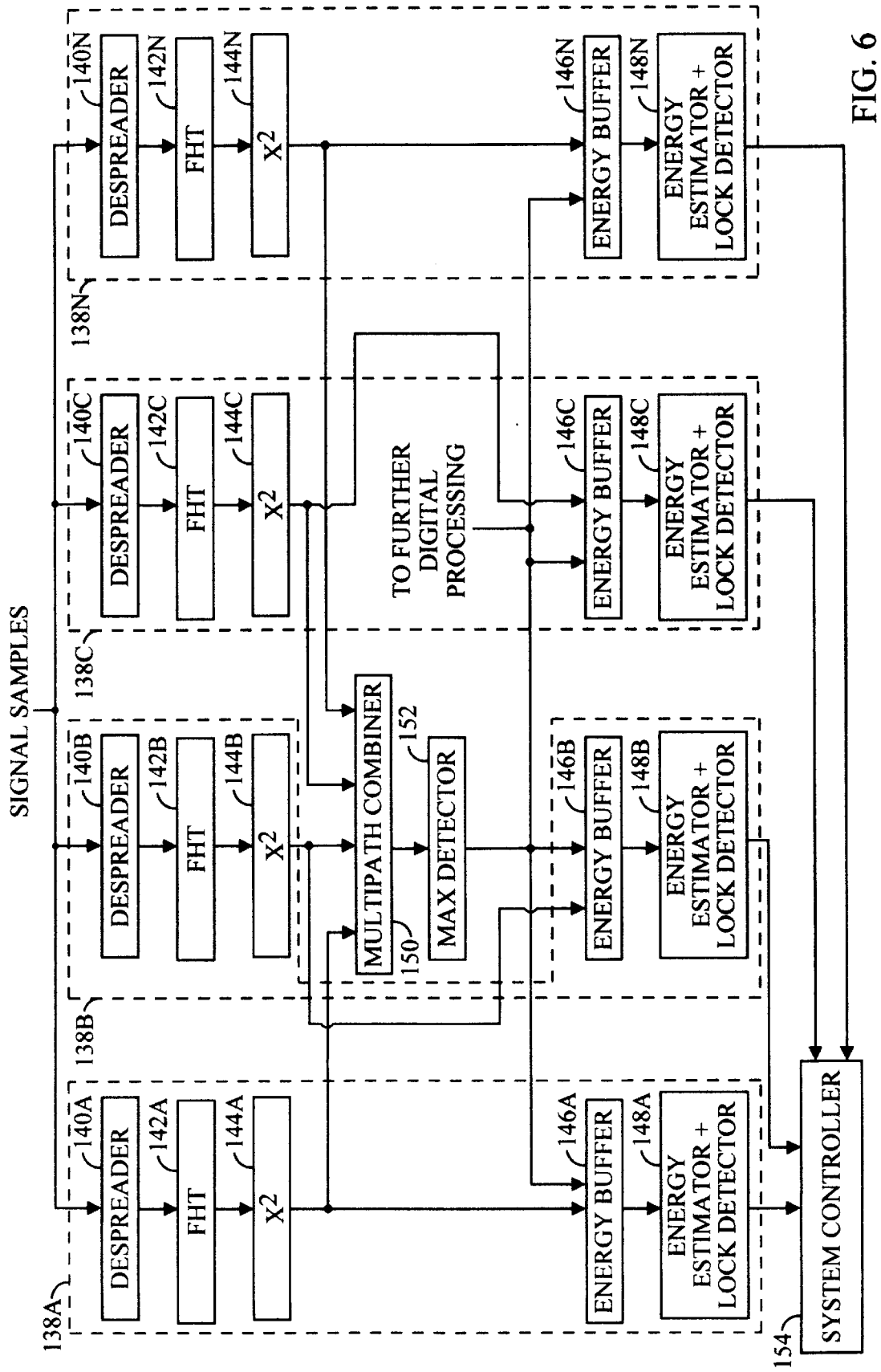
FIG. 6 is a block diagram of a receiver configured to operate in a system in which multiple instances of a common signal are received in relatively close temporal proximity to one another.

FIG. 6 is a block diagram of a receiver especially configured to operate in a system in which multiple instances of a common signal are received in relatively close temporal proximity to one another, although it can be used in other types of systems as well. The receiver in FIG. 6 is comprised of a series of demodulation elements 138A–138N. The demodulation elements 138A–138N receive a series of signal samples from the wireless link. Within the demodulation element 132A, the despreader 140A, FHT 142A and the energy determination block 144A operate in a manner similar to the corresponding elements in the demodulation element 118A of FIG. 4. The energy values output by the energy determination block 144A are input into an energy buffer 146A where they are stored for further processing. The demodulation elements 138B–138N comprise corresponding elements which operate in a similar manner. The output of each of the energy determination blocks 144A–144N are input into the multipath combiner 150. The multipath combiner 150 combines the energy values and outputs a set of combined energy values, one corresponding to each of the possible data values. The output of the multipath combiner 150 is coupled to a maximum detector block 152 which determines the most likely transmitted data value based upon the set of combined energy values.

The output of the maximum detector 152 is coupled to the energy buffers 146A–146N. The energy buffers 146A–146N output the energy level corresponding to the most likely transmitted data value determined by the maximum detector 152. The output of the energy buffers 146A–146N are input into the energy estimators and lock detectors 148A–148N, respectively, which operate in a similar manner to the energy estimators and lock detectors 128B. The output of the lock detectors 148A–148N are input into a system controller 154 which, in one embodiment, executes a demodulation assignment algorithm, such as in accordance with the above referenced U.S. Pat. No. 5,490,165. In one embodiment, the system controller 154 is a general purpose microprocessor. In order to unclutter the figure, some of the connections between the demodulation elements 138A–138N and the system controller 160 are not shown.

Figure 7:
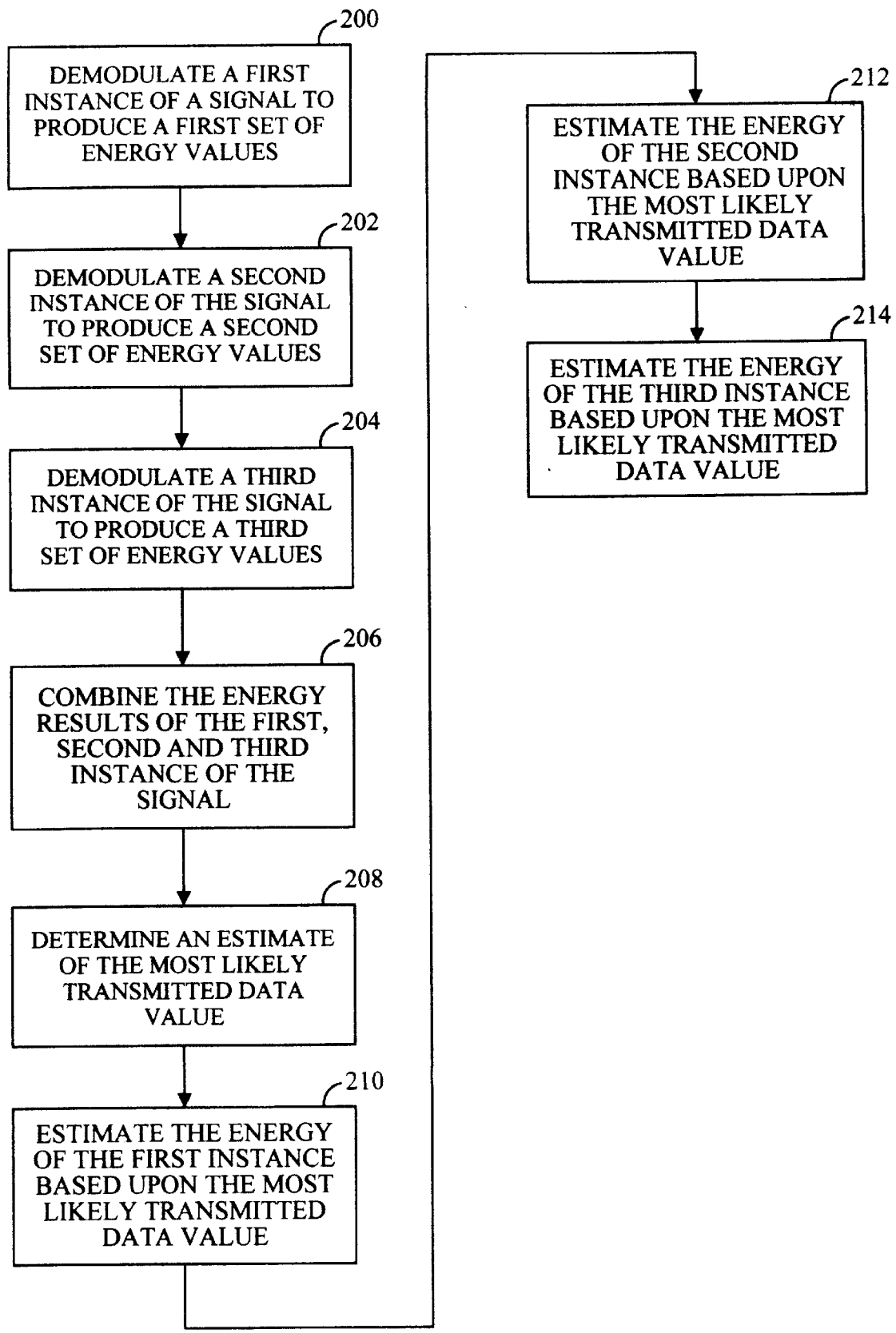
FIG. 7 is a flow chart showing operation of the invention in accordance with the receiver of FIG. 6.

Operation in accordance with FIG. 6 may be more clearly understood by reference to the flowchart of FIG. 7. In block 200, a first instance of the signal is demodulated to produce a first set of energy values. In block 202, the second instance of the signal is demodulated to produce a second set of energy values. In block 204, a third instance of the signal is demodulated to produce a third set of energy values. In block 206, the first, second and third set of energy values are combined. In block 208, an estimate of the most likely transmitted data value is determined based upon the combined set of energy values. As noted above, a determination of the most likely transmitted data value is on average more accurate when it is based upon the combined energy levels rather than one of the individual sets of energy values. In block 210, an estimate of the energy of the first instance is determined based upon the most likely transmitted data value. For example, the energy value within the first set of energy values which corresponds to the most likely transmitted data value is used to determine the average energy of the first instance of the signal. Likewise, in block 112, an estimate of the energy of the second instance of the signal is determined. In block 214, an estimate of the energy in the third instance of the signal is determined based upon the most likely transmitted data value. Although FIGS. 6 and 7 show the demodulation of three or more instances of the signal, in some embodiments, just two instances of the signal can be demodulated.

The embodiment shown in FIGS. 6 and 7 has performance advantages over the embodiment shown in FIGS. 4 and 5. The performance advantages are gained because the output of the maximum detector 152 is the best estimate of the most likely transmitted data value available at the receiver while the output of the maximum detectors 126A–126C of FIG. 4 is not the best estimate in some cases (such as when additional signal instances are available). In FIG. 4, only the output of the maximum detector of the demodulation element assigned to the latest arriving signal instance uses all the energy information available at the receiver at all times.

However, the embodiment shown in FIGS. 4 and 5 can be more practical to implement if the time difference between the arrival times of the signal instances is relatively large. As the time offsets between the successive signal instances increase, the amount of data which must be buffered until the most likely transmitted data value is determined increases. At some point, the quantity of data which must be stored becomes prohibitive. In addition, such operation introduces a delay in the lock detection process which decreases the response time of the energy estimation process to changes in a signal instance. The configuration in FIGS. 4 and 5 allows a more rapid determination of the lock state of the demodulation processes corresponding to the earliest arriving signal than is possible with FIGS. 6 and 7. In addition, the configuration reduces the average amount of data stored in the system for a set of given time offsets as compared to FIGS. 6 and 7.

As noted above, even if each demodulation element produces data which is incorrect eighty percent of the time, the combined signal error rate can be as low as ten percent. Therefore, the average accuracy of the energy estimation of the signal instances in accordance with the invention is significantly greater than the prior art. For this reason, the threshold value at which the system indicates a state of lock can be reduced in comparison to the prior art. In this way, valid signal instances arriving at low power levels can be distinguished from noise and can continue to be used with confidence, thus, increasing on average the amount of energy used to determine the most likely transmitted data value. Using the more accurate lock detection mechanisms of the present invention, lower level signal instances can be detected thus increasing the total energy received from the remote unit, thus further increasing the performance of the system.

The more accurate estimation of the received energy is also advantageous to other functions executed by the remote unit. For example, the energy estimation is also used in assignment of the demodulation element such as, for example, as disclosed in U.S. Pat. No. 5,490,165. More accurate energy estimation results in more accurate assignment and increased system performance. For example, a system controller can determine an assignment of demodulating resources based upon an energy estimation determined according to the invention.

With reference to the information above, a myriad of alternate embodiments within the scope of the invention will be readily apparent to one skilled in the art, such as the simple re-arrangement of the blocks shown in the figures. For example, in the receiver shown in FIG. 4, the detection threshold which is used to detect a state of lock can be lower for the demodulation elements assigned to later arriving instances than the demodulation element assigned to the earlier arriving signal instances.

Although the demodulation elements are shown in FIGS. 4 and 6 as comprising discrete elements, in some embodiments, these elements can be embodied in a time multiplexing architecture in which multiple instances of a signal are sequentially processed by a common set of circuit elements. One such embodiment is detailed in U.S. Pat. No. 5,654,979 referred to above. Generally such embodiments are implemented in application specific integrated circuits (ASIC) although they can also be designed with discrete components or executed in software. The elements of FIGS. 4 and 6 can be steps of a method.

The embodiments above are described with reference to a system which uses Walsh symbols. The techniques described herein can be applied to system which use other means and methods of encoding and decoding the data.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method of energy estimation in a communication system comprising the steps of:
   demodulating a first instance of a signal to produce a first set of energy values corresponding to a set of possible data values of said signal;
   demodulating a second instance of said signal to produce a second set of energy values corresponding to said set of possible data values;
   combining said first and said second sets of energy values to determine a combined set of energy values;
   determining a first estimate of a most likely transmitted data value based upon said combined set of energy values; and
   estimating an energy level of said first instance based upon the energy value within said first set of energy values corresponding to said first estimate of said most likely transmitted data value.

2. The method of claim 1, further comprising the step of estimating an energy level of said second instance based upon the energy value within said second set of energy values corresponding to said first estimate of said most likely transmitted data value.

3. The method of claim 1, further comprising the step of determining an assignment of demodulating resources based upon said energy level of said first instance.

4. The method of claim 1, further comprising the step of determining a state of lock or unlock of said step of demodulating said second instance based upon said second set of energy values.

5. The method of claim 1, further comprising the steps of:
   demodulating a third instance of said signal to produce a third set of energy values corresponding to said set of possible data values;
   combining said third set and said combined set of energy values to determine a second combined set of energy values;
   determining a second estimate of said most likely transmitted data value based upon said second combined set of energy values; and
   estimating an energy level of said third instance based upon the energy value within said third set of energy values corresponding to said second estimate of said most likely transmitted data value.

6. The method of claim 5, further comprising the step of determining a state of lock or unlock of said step of demodulating said first instance based upon said energy level of said first instance.

7. The method of claim 1, further comprising the steps of:
   demodulating a third instance of said signal to produce a third set of energy values corresponding to said set of possible data values;
   wherein said step of combining further comprises the step of combining said third set of energy values with said first and second sets of energy values to produce said combined set of energy values; and
   estimating an energy level of said third instance based upon the energy value within said third set of energy values corresponding to said first estimate of said most likely transmitted data value.

8. A receiver in a wireless system comprising:
   means for demodulating a first instance of a signal to produce a first set of energy values corresponding to a set of possible data values of said signal;
   means for demodulating a second instance of said signal to produce a second set of energy values corresponding to said set of possible data values;
   means for combining said first and said second sets of energy values to determine a combined set of energy values;
   means for determining a first estimate of a most likely transmitted data value based upon said combined set of energy values; and
   means for estimating an energy level of said first instance based upon the energy value within said first set of energy values corresponding to said first estimate of said most likely transmitted data value.

9. The apparatus of claim 8, further comprising means for estimating an energy level of said second instance based upon the energy value within said second set of energy values corresponding to said first estimate of said most likely transmitted data value.

10. The receiver of claim 8, further comprising means for determining an assignment of demodulating resources based upon said energy level of said first instance.

11. The receiver of claim 8, further comprising means for determining a state of lock or unlock of said means for demodulating said second instance based upon said second set of energy values.

12. The receiver of claim 8, further comprising:
means for demodulating a third instance of said signal to produce a third set of energy values corresponding to said set of possible data values;
means for combining said third set and said combined set of energy values to determine a second combined set of energy values;
means for determining a second estimate of said most likely transmitted data value based upon said second combined set of energy values; and
means for determining a state of lock or unlock of said means for demodulating said third instance based upon the energy value within said third set of energy values corresponding to said second estimate of said most likely transmitted data value.

13. The apparatus of claim 12, further comprising means for determining a state of lock or unlock of said means for demodulating said first instance based upon said energy level of said first instance.

14. The receiver of claim 8, further comprising:
means for demodulating a third instance of said signal to produce a third set of energy values corresponding to said set of possible data values;
wherein said means for combining further comprises means for combining said third set of energy values with said first and second sets of energy values to produce said combined set of energy values; and
means for estimating an energy level of said third instance based upon the energy value within said third set of energy values corresponding to said first estimate of said most likely transmitted data value.

15. A rake receiver comprising:
a first demodulation element configured to receive a series of signal samples, said first demodulation element also configured to be assigned to a first instance of a signal and configured to produce a first set of energy values corresponding to a set of possible data values of said signal;
a second demodulation element configured to receive said series of signal samples, said second demodulation element also configured to be assigned to a second instance of said signal and configured to produce a second set of energy values corresponding to said set of possible data values of said signal;
a combiner configured to combine said first and second sets of energy values and configured to produce a combined set of energy values;

a maximum detector configured to determine a first estimate of a most likely transmitted data value based upon said combined set of energy values; and
an energy estimator configured to determine an energy level of said first instance based upon the energy value within said first set of energy values corresponding to said first estimate of said most likely transmitted data value.

16. The rake receiver of claim 15, further comprising a controller which assigns said first and second demodulation elements to a next signal instance based upon said energy level of said first instance.

17. The rake receiver of claim 15, wherein said second instance is an earlier arriving signal than said first instance, said receiver further comprising a second lock detector configured to determine a state of lock of said second demodulation element based upon said second set of energy values.

18. The rake receiver of claim 15, further comprising:
a third demodulation element configured to receive said series of signal samples, said third demodulation element also configured to be assigned to a third instance of said signal and configured to produce a third set of energy values corresponding to said set of possible data values of said signal;
wherein said combiner is further configured to combine said third set of energy values with said first and second set of energy values to produce said combined set of energy values; and
an energy estimator configured to determine an energy level of said third instance based upon the energy value within said third set of energy values corresponding to said first estimate of said most likely transmitted data value.

19. The rake receiver of claim 15, further comprising:
a third demodulation element configured to receive said series of signal samples, said third demodulation element also configured to be assigned to a third instance of said signal and configured to produce a third set of energy values corresponding to said set of possible data values of said signal;
a second combiner configured to combine said third set of energy values with said combined set of energy values to produce a second combined set of energy values;
a second maximum detector configured to determine a second estimate of said most likely transmitted data value based upon said second combined set of energy values; and
a third lock detector configured to determine a state of lock of said third demodulation element based upon the energy value within said third set of energy values corresponding to said second estimate of said most likely transmitted data value.

20. The rake receiver of claim 19, further comprising a first lock detector configured to determine a state of lock of said first demodulation element based upon said energy level of said first instance.

* * * * *